(12) United States Patent
Loveless et al.

(10) Patent No.: US 10,719,187 B2
(45) Date of Patent: Jul. 21, 2020

(54) RESOURCE TRACKING

(71) Applicant: CFPH, LLC, New York, NY (US)

(72) Inventors: Jacob Loveless, New York, NY (US); Randy LeBeau, New York, NY (US)

(73) Assignee: CFPH, LLC, New York, NY (US)

( * ) Notice: Subject to any disclaimer, the term of this patent is extended or adjusted under 35 U.S.C. 154(b) by 495 days.

(21) Appl. No.: 15/053,740

(22) Filed: Feb. 25, 2016

(65) Prior Publication Data
US 2016/0299637 A1 Oct. 13, 2016

Related U.S. Application Data

(60) Provisional application No. 62/145,878, filed on Apr. 10, 2015.

(51) Int. Cl.
| | | |
|---|---|---|
| *G06F 17/00* | (2019.01) | |
| *G06F 3/0481* | (2013.01) | |
| *G06Q 40/04* | (2012.01) | |
| *G06Q 10/06* | (2012.01) | |
| *H04L 12/26* | (2006.01) | |

(52) U.S. Cl.
CPC ........... *G06F 3/0481* (2013.01); *G06Q 10/06* (2013.01); *G06Q 40/04* (2013.01); *H04L 43/045* (2013.01); *H04L 43/08* (2013.01); *H04L 43/0817* (2013.01)

(58) Field of Classification Search
CPC .. G06F 3/04842; G06F 3/0482; G06F 3/0481; G06F 3/04847; G06F 17/30554; G06F 17/30572; G06F 3/0488; G06F 3/04817; G06F 9/451; G06F 3/0484; G06F 3/0486; G06F 9/4443; G06F 17/2247; G06F 17/245
See application file for complete search history.

(56) References Cited

U.S. PATENT DOCUMENTS

| | | |
|---|---|---|
| 2007/0005477 A1 | 1/2007 | Mcatamney |
| 2007/0198397 A1 | 8/2007 | McGinley et al. |
| 2013/0239111 A1 | 9/2013 | Bingham et al. |
| 2014/0280864 A1 | 9/2014 | Yin et al. |
| 2015/0073666 A1 | 3/2015 | Dotterweich et al. |
| 2016/0103592 A1* | 4/2016 | Prophete ............. G06F 3/04845 715/771 |

OTHER PUBLICATIONS

Notification of Transmittal of the International Search Report and the Written Opinion of the International Searching Authority for International Application No. PCT/US2016/019759 dated May 3, 2016 (10 pages).

* cited by examiner

*Primary Examiner* — Di Xiao

(57) ABSTRACT

Some embodiments relate to resource usage tracking. A resource monitor may monitor resources of a network. A database may record resource usage. A client program may provide resource in a graphical display at a variety of specificity levels. A user may select portions of the graphical display to adjust information presented.

10 Claims, 9 Drawing Sheets

RESOURCE TRACKING

CROSS REFERENCE TO RELATED APPLICATIONS

This application claims priority to U.S. provisional application 62/145,878 filed on Apr. 10, 2015, which is hereby incorporated herein by reference

FIELD

Some embodiments may relate to resource usage.

BACKGROUND

Computing environments offer limited resources to accomplish complex tasks.

SUMMARY

The following should be interpreted as example embodiments and not as claims.

A. An apparatus comprising: at least one resource monitor configured to: monitor one or more resources of a network configured for low latency trading operations at a first level of specificity; and report the monitored one or more resources to a database system at the first level of time-specificity, in which reporting include identifying a respective monitored time; the database system configured to: receive the reported monitored one or more resources; in response to receiving the reported monitored one or more resources, store the reported monitored one or more resources keyed by the respective monitored time at the first level of specificity; receive a request, from a client program, for information about the one or more resources from a range of time; in response to receiving the request for information, transmitting, to the client program, data indicating the usage of the one or more resources over the range of time at the first level of specificity; the client program configure to: receive a selection of the one or more resources and the range of time; in response to receiving the selection, transmitting, to the database system, the request for information; receiving, from the database system, the data indicating the usage of the one or more resources over the range of time at the first level of specificity; in response to receiving the data, render the data into a graphical representation of the data with a second level of specificity, in which the second level of specificity is less specific than the first level of specificity, in which the graphical representation of the data with the second level of specificity: 1) presents the information in a circular format with time increasing around the circle, and 2) is divided into a plurality of slices of times in the range of time, in which each slice of the plurality of slices covers a portion of the range of time, in which the plurality of slices sum to the whole range of time, in which each slice presents a level of resource usage at the second level of specificity; receiving a selection of one slice of the plurality of slices of the graphical representation; and in response to receiving the selection of the one slice of the plurality of slices, adjusting the graphical representation to focus on the portion of the range of time covered by the one slice, in which adjusting the graphical representation includes: 1) expanding the one slice to cover the circular format of the graphical representation, and 2) dividing the one slice into a plurality of subslices that each cover a portion the portion of the range of time covered by the one slice and in which the plurality of sub slices sum to the portion of time covered by the one slice, in which each sub slice presents a level of resource usage over a respective covered time.

A.1. The apparatus of claim A, in which the at least one resource monitor includes a processor. A.2. The apparatus of claim A, in which the network includes a software defined network. A.3. The apparatus of claim A, in which the one or more resources includes at least one of CPU usage, memory pressure, memory rate, network input/output, temperature, power usage, latency, free memory, memory fragmentation, available bandwidth, and used bandwidth. A.4. The apparatus of claim A, in which the one or more resources includes at least one of: number of trades per second, amount of money, instruments traded, incoming orders, executed trades, outgoing orders, number of cancelations, and volume of sales or purchases. A.5. The apparatus of claim A, in which the at least one resource monitor includes a plurality of resource monitors. A.6. The apparatus of claim A, in which the adjusted graphical representation allows a user to further adjust the graphical presentation to become more specific. A.7. The apparatus of claim A, in which the adjusted graphical representation includes a control that allows a user to remove the adjustment. A.8. The apparatus of claim A, in which the each subslice presents at the first level of specificity. A.9. The apparatus o claim A, in which each subslice presents at a level of specificity that is less specific than the first level of specificity. A.10. The apparatus of claim A, in which the graphical representation before the adjustment includes concentric slices at different levels of specificity that are each less specific than the first level of specificity.

FIGURES

DETAILED DESCRIPTION

Some embodiments provide a convenient manner of visualizing resource usage in a computer environment. One example environment in which such visualization of resource usage might be useful is a high frequency trading environment. In such an environment, a delay in processing or transmission can be costly. Such networks may be desired to be low latency to facilitate high speed trading. Visualizing resource usage may allow for optimization of a system, tracking of bottlenecks, and understanding of the system's weaker points. One example high frequency trading environment that may benefit from the use of such visualization includes the Lucera high frequency trading cloud. Such a network may include a software defined network.

Figure 1:
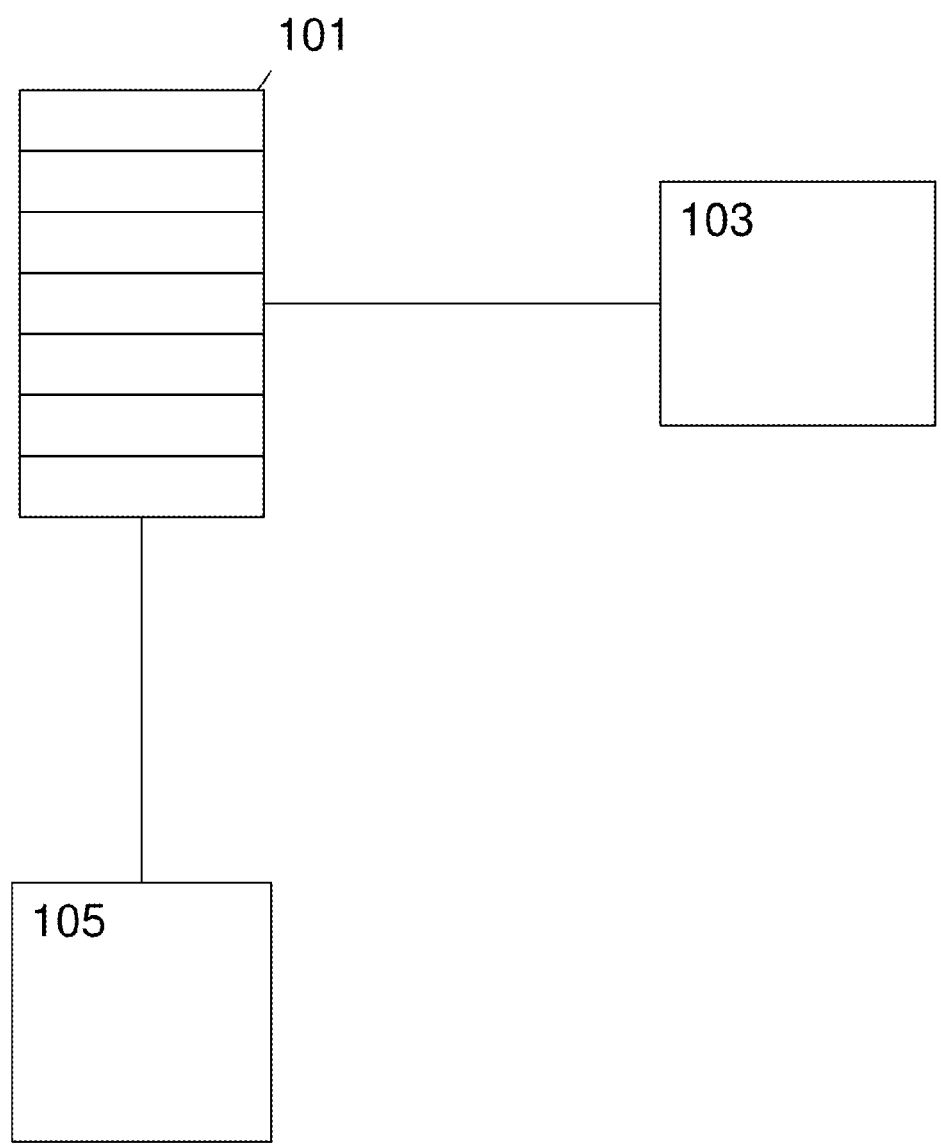
FIG. 1 depicts a system according to at least one embodiment disclosed herein.

FIG. 1 illustrates an example structure that may be used in some embodiments. A database 101 may store data indicating during each of a plurality times. The database may be stored by a database system. Such a system may include a computing device such as a server or other device that may provide access to and/or processing related to data stored in the database.

In some embodiments, the data may be stored at a highest level of specificity that may be visualized (e.g., highest specificity segment in a tier discussed elsewhere). For example, in an embodiment where a visualization tool provides a highest level of specificity at a per minute level (as illustrated in some of the figures), then the data may be stored in the database at a per minute level. This may allow for efficient accessing of data at this highest level of specificity. It should be recognized that per minute is given as an example only. Other levels of specificity may be used as desired. For example, in a high frequency trading environment, a second may be considered a long period of time. Embodiments in such an environment may have specificity as great as micro seconds, milliseconds, nanoseconds, picoseconds, and/or any level of specificity that is desired. In other environments, a minute may be considered a short time and the highest level of specificity may be much longer (e.g., a day).

Data may also be stored at a less specific level, such as the per hour level in addition to the higher specificity level. This additional storage may allow for quick access at this less specific level.

Other embodiments may not have such additional storage of data. In such embodiments, data at the higher specificity level may be used to calculate data for a less specific level. For example, usage per minute may be used to calculate usage over an hour. Storage in such a manner may save storage space but may be more intensive to calculate at a later time. The calculation of the less specific data may be done by a database system and/or a client displaying a visualization as desired.

Still other embodiments may store data at a level of specificity based on received information. For example, if data is received indicating resource usage over each second, then data may be stored at a per second level of specificity. This approach may allow for an efficient writing of data into the database. The data may later be processed to provide a desired visualization specificity.

Some embodiments may combine approaches. For example, data may be stored at a greatest level of specificity and at some lower levels of specificity and at a received level of specificity but not at all lower levels of specificity that may be visualized. Such an approach may offer some increase in speed at the cost of some storage.

The data that may be stored may reflect the usage of some resource over various time periods. For example, data for the first hour of a day may be stored indicating resource usage over that hour. As another example, data about the second fifteen minute period in a particular hour may be stored indicating resource usage over that fifteen minute period. It should be recognized that hour and fifteen minutes are given as example time periods only. For each period desired and at each specificity level desired, a resource usage over the time period may be stored in the database. Such data may be accessed to provide a visualization of the resource usage. In some embodiments a continuous storage of resource usage data may be maintained.

The stored data may be indicative of one or more resources used. For example, CPU usage/time, memory pressure, memory rate, network input/output, actions per time period e.g., number of trades per second in an HFT environment), volume per time period (e.g., amount of money and/or instruments traded in an HFT environment), inbound actions (e.g., incoming orders), outbound actions (e.g., executed trades, outgoing orders), temperature, power usage, latency, free memory, memory fragmentation, available bandwidth, used bandwidth, number of cancelations, volume of sales and/or purchases, and/or any information indicative of a desired resource may be stored. Although examples are given in the resource usage and trading environment, it should be recognized that other things and/or environments may benefit from visualization. For example, anything with a count, percentage, continuous of discrete set of values, and so on may be visualized in some embodiments.

The stored data may be indicative of some aspect of a resource. For example, maximum over a period of time, a count over a period of time, a minimum over a period of time, a mean over a period of time, a median over a period of time, a mode over a period of time, and/or any desired aspect of a resource may be stored.

Data may be stored in the database so that the time period it describes may be determined. For example, data may be keyed with a time indicator. In some embodiments data may be stored so that a specificity level may be determined. For example, data may be keyed with an indicator of a specificity of the data. In some embodiments, a database may respond to a query for a time period with data indicating resource usage over that time period. In some embodiments such a query may indicate a desired specificity level, and a database may respond accordingly.

A database system may receive reports regarding the resource usage and store information about those reports according to a scheme such as the ones described above or otherwise as desired. The data received may indicate resource usage over a period of time that corresponds with a desired stored specificity of time (e.g., a greatest level of specificity, etc.) or other specificity of time. The data received may be an ongoing data (e.g., a continuous count), data at a greater level of specificity (e.g., data at a microsecond level when the data is stored at the second level), and so on. Such data may be processed before it is stored so that it is stored at a level of specificity that is desired and/or may be stored directly.

For example, an ongoing report of trades may be received by a database system. The report may indicate each time a trade is made. The database system may sum the count of trades over a period of time to store a count of trades per period of time. As another example, a CPU usage per microsecond report may be received by a database system. In some embodiments, the database system may store the usage per microsecond information.

In other embodiments, the database system may combine together a group of such reports to create a usage per second report and store the usage per second report. Depending on the aspect of usage being measured the combination may take a variety of forms. For example, a maximum usage per microsecond may be combined so that the maximum usage over a second is created by choosing the highest of a million maximum usages per microsecond as the maximum per second. As another example, a minimum per second from minimum per microseconds may be found and/or stored in a similar manner. As yet another example, an average per second may be found from averages per microsecond by summing a million microsecond averages and dividing by a million. It should be recognized that levels of specificity and manners of combining higher levels of specificity to generate lower levers of specificity are given as examples only. In some embodiments, multiple levels of specificity may be determined and/or stored from such data. One of ordinary skill in the art will understand from these examples, that other manners of combination and other specificities may be used.

Reports of usage that may be used to create usage visualizations may be received from any desired source. For example, a router, switch, hub, access point, dedicated network monitor, and/or other device may report network usage. A computer device may be configured to report resource usage of the computer device. For example, a CPU may report memory and/or processor time. An FPGA may be programmed to include a reporting element of one or more resources.

Such reporting may include transmitting data to a database system. A database system may be separate from a system or resource being monitored and/or may be part of a same system. Such transmission may include transmission over a data bus and/or a computer network such as a LAN, the Internet, and so on.

Although a single reporting entity 103 is shown in the examples, it should be recognized that any number of resources used by any number of reporting entities may be visualized, tracked, stored, and so on in various embodiments, For example, a data center worth of processors may be tracked in some embodiments. In an embodiment where there may be multiple resources and/or devices being tracked, an entry in a database may be made for each device and/or resource.

Some embodiments may include a client device 105 that may present a visualization of usage information to a user. A client device may include a computing device such as a general purpose computer, a smartphone, and/or any desired device. A program may execute on such a device (e.g., by executing instruction by a processor) that may receive information from database system 101 and present the information to a user as a visualization of resource usage. Information may be received over a network such as a LAN or the Internet.

Client device 105 may process the information. For example, a JavaScript program or other program may receive a highest level of specificity data and may aggregate it into less specific data in some embodiment. In other embodiments, the program may receive information at a plurality of specificity levels and display the received data in a rendered form. The program may process data into a visual form for user to view the usage data. The program may receive actuations of controls (e.g., mouse clicks) and respond to the actuations by altering the displayed visualization in a desired manner. For example, the program may request additional data form the database system in response to a click of a segment and then may alter the visualization to reflect the new data. As another example, the program may otherwise display previously received information in a new way in response to an actuation (e.g., by further processing and/or rendering the data in a new way).

Figure 2:
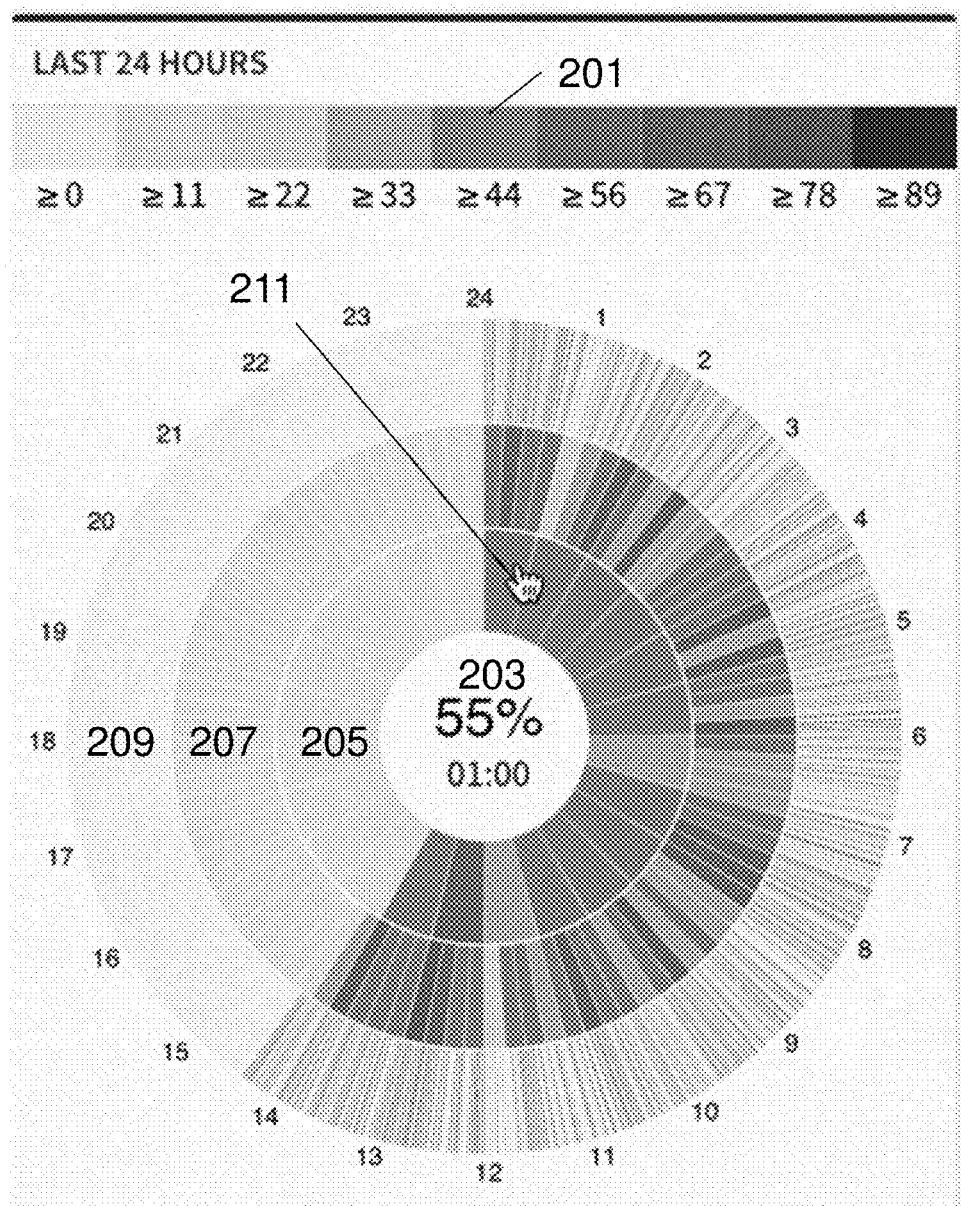
FIG. 2 depicts an example interface according to at least one embodiment disclosed herein.

FIG. 2 illustrate an example of a visualization of usage data that may be presented in some embodiments. Such a visualization may be created by a program run on a client based on input from a user and data received from a database.

As illustrated in FIG. 2, a visualization of resource usage may include a key 201, a numerical indicator 203, a first tier 205, a second tier 207, and a third tier 209. Each tier may visualize resource usage at different specificities in a graphical manner. The tiers may be arranged in a concentric manner so that as tiers move from one direction to another the specificity increases. In this example, the tiers are arranged in a circular manner so that the outer tier is the most specific and the inner tier is the least specific. This is given as an example only and other examples may have tiers with more specificity and/or be arranged in other shapes such as squares.

Key 201 may show a conversion from the graphical manner to a numerical manner. In this instance a percentage of CPU usage is shown and a key indicates how a color corresponds to a percentage. As the color gets darker the percentage gets higher in this example. In other embodiments, each tier may have a different key, a key may be arranged differently or not used at all, and/or a key may change as a visualization changes.

The first tier 205 is arranged in this example as a circular element around a numerical indicator 203. The first tier shows data at a first level of specificity. In this examples that is the lowest level of specificity. Here, the lowest level of specificity is an hour and the display is set to show one day's worth of data. So, the first tier is arranged to show twenty-four hours in that one day by arranging the first tier into twenty-four consecutive hour segments corresponding to the twenty-four hours in the day.

As indicated, a cursor 211 may move around the visualization. In this instance the cursor is hovering over a first segment of the first tier that corresponds to the first hour of the day.

Figure 3:
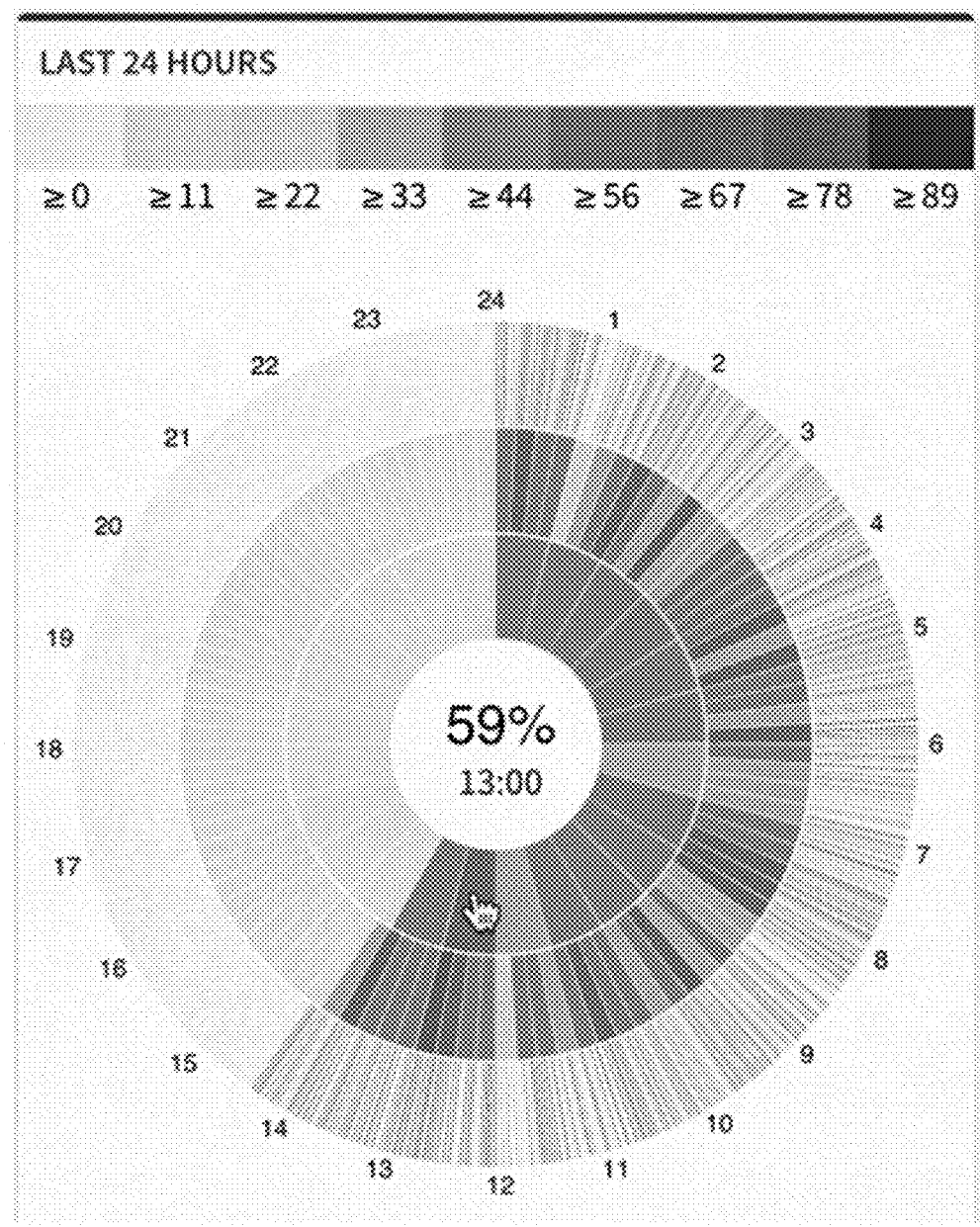
FIG. 3 depicts an example interface according to at least one embodiment disclosed herein.

Numerical indicator 203 is arranged to indicate a numerical value corresponding to the section of the tier that is being selected and/or hovered over by the cursor. Here, 55% and 1:00 is shown to indicate that during the first hour the CPU usage was 55%. As the cursor moves from segment to segment and/or tier to tier, the numerical indicator may be updated with data reflecting new tiers and segments. For example, FIG. 3 shows the cursor moved to a new segment in tier 1. In this instance the thirteenth hour of the day is selected and/or hovered over, so the numerical indicator shows 13:00 and an indication that CPU usage during that time was 59%. While just a single element is displayed by the indicator in this example, it should be recognized that the indicator may become as complex as desired (e.g., may have multiple CPU usages for multiple processors, may have heat, memory, and/or other elements)

To determine numbers for display by a numerical indicator as a cursor moves, a program may reference data received from the database system and render the data to make a number that corresponds to the time period selected and/or hovered over. To fill of visualization of segments in a tier, a program may reference data received from the database system and a conversion of that data to a color (e.g., that corresponds with the key). The program may do that for each segment and may render the determined colors into the visualization in the arrangement of the tiers. In some embodiments, the program may process received data to different levels of specificity first. In other embodiment the program may receive the data already processed into the desired levels of specificity. Each time a display is changed (e.g., such as by actuating a segment) a program may reprocess data, redetermine a layout, redetermine a color for each segment of each tier, render a visualization according to determined information and/or take any desired actions to facilitate a visualization of the data.

It should be recognized that any arrangement may be used in terms of level of specificity, number of items displayed over a length of time, arrangement of times, positioning of a numerical indicator, number of tiers, and so on.

A second tier 207 indicates data at a greater level of specificity than a first tier. In this example, the second tier is arrange concentrically around the first tier. The second tier is positioned so that times match with the times of the first tier. Here, the second tier shows data at a fifteen minute increment level of specificity. It is arranged so that a start of a first fifteen minute segment is aligned with a start of an hour segment of the first tier, the subsequent fifteen minute segments follow so that the last fifteen minute segment ends with the end of the corresponding hour segment of the first tier. The key applies to each of the tiers in this example in the same manner. In other implementations there may be a different key for each tier.

Figure 4:
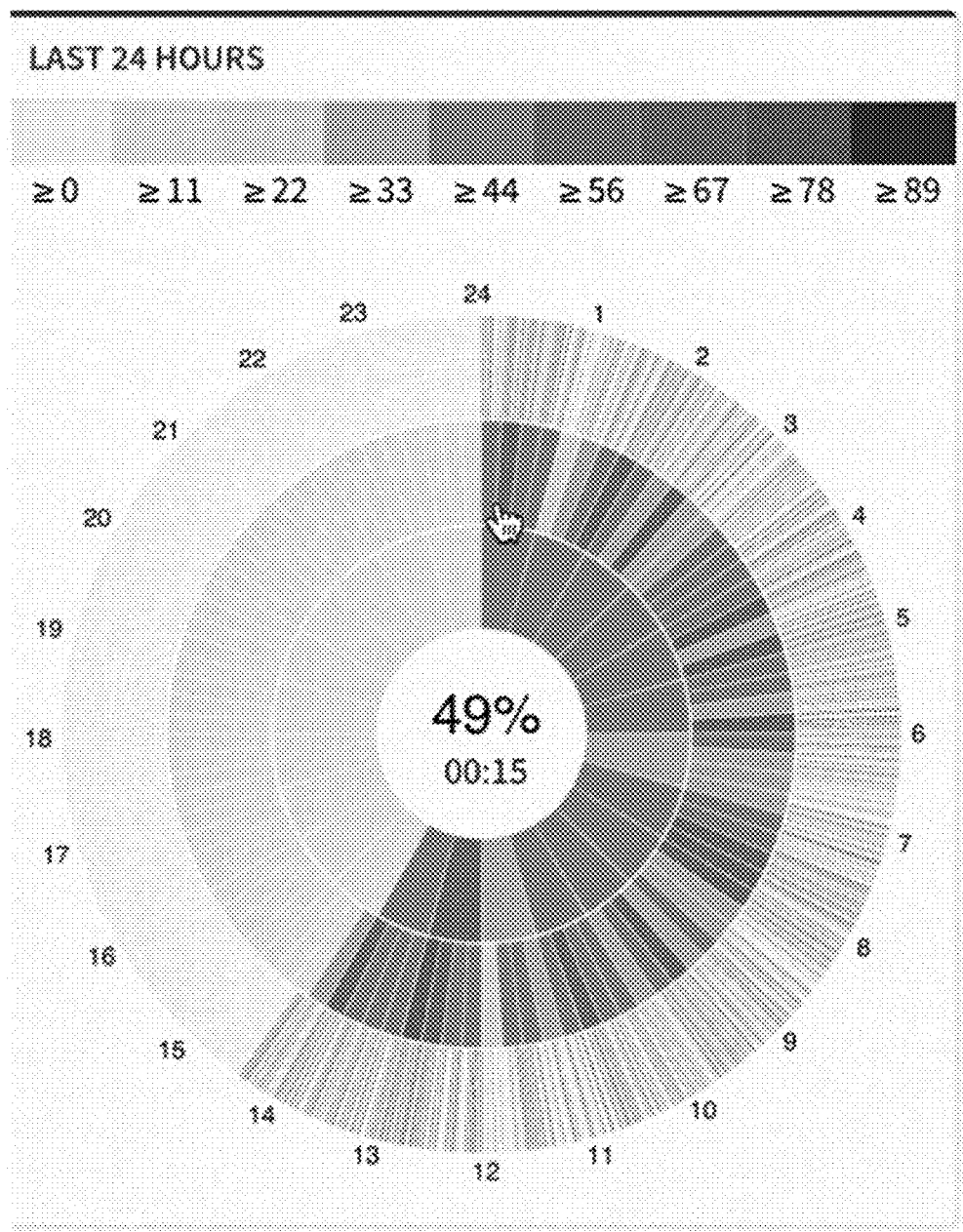
FIG. 4 depicts an example interface according to at least one embodiment disclosed herein.

A user may move a cursor over or otherwise select a segment in the second tier to adjust a numerical indicator. FIG. 4 shows an example where the cursor is moved over the first segment of the second tier. This segment corresponds to the first fifteen minutes of the first hour of the twenty-four hour period covered by the visualization. The numerical indicator is adjusted to reflect the 00:15 time and that CPU usage was 49% during that time period. As with the first tier, the cursor may be moved from segment to segment and the numerical indicator will be adjusted in response.

A third tier 209 may indicate data at a still further level of specificity than the second tier. In this example, the third tier is arranged concentrically around the second tier. The third tier is positioned so that times match with the times of the first and second tiers. Here, the third tier shows data at a single minute increment level of specificity. It is arranged so that a first minute segment is aligned with a start of both an hour segment of the first tier and a fifteen minute segment of the second tier. Subsequent minute segments follow so that they continue to align with the lower tiers.

Figure 5:
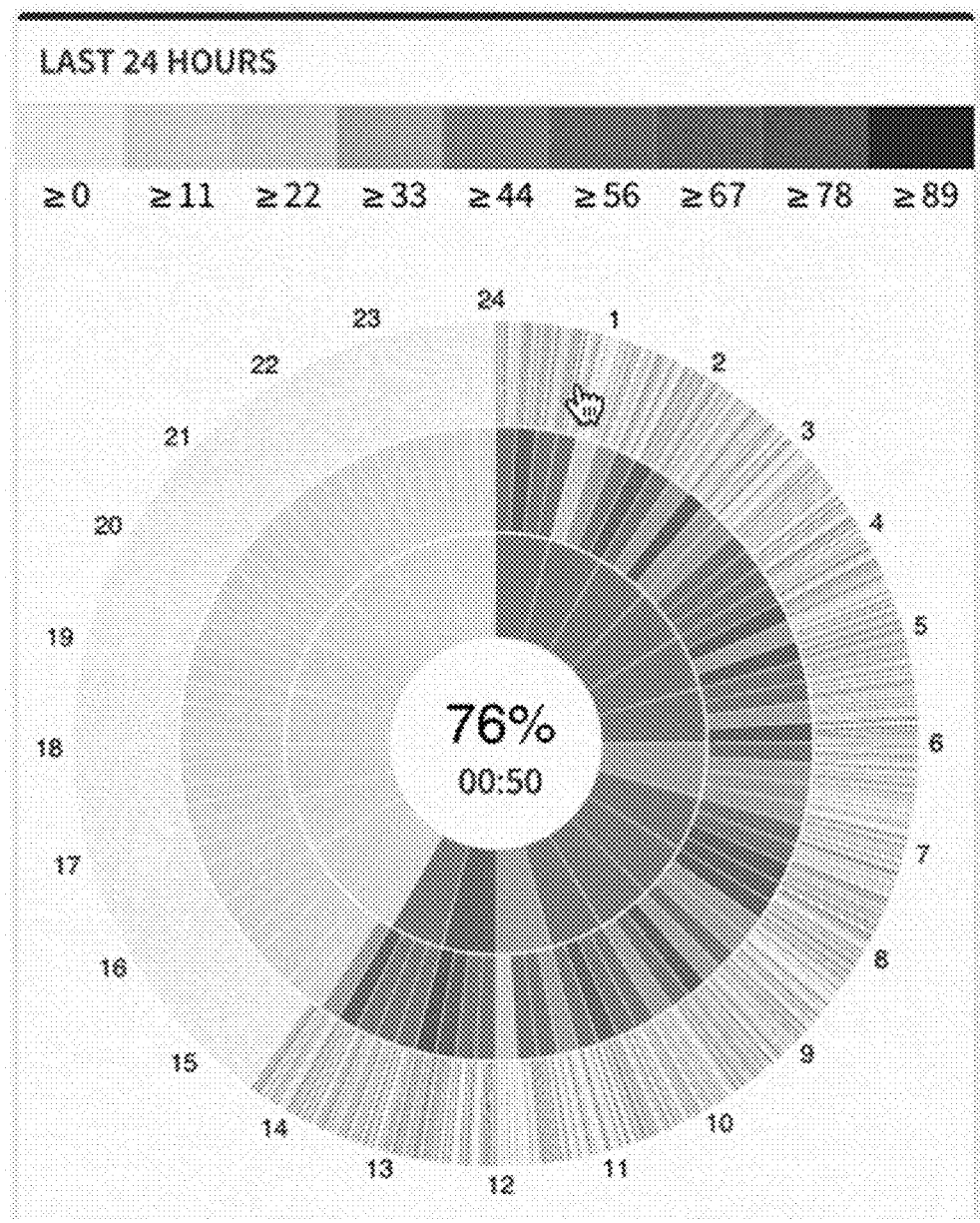
FIG. 5 depicts an example interface according to at least one embodiment disclosed herein.

A user may move a cursor over or otherwise select a segment in the third tier to adjust a numerical indicator. FIG. 5 shows an example where the cursor is moved over the fiftieth segment of the third tier. This segment corresponds to a portion of the fourth segment of the second tier and the first segment of the first tier. The numerical indicator is adjusted to reflect the 00:50 time and that CPU usage was 76% during that time period. As with the first and second tiers, the cursor may be moved from segment to segment and the numerical indicator will be adjusted in response.

It should be recognized that the figures are given as non-limiting examples only. Other examples may have specificity that differs. For example, specificity may be much lower or much greater. Other embodiments may have a greater or lower number of tiers. More tiers may continue to be more specific. More tiers may continue to be concentric and aligned with inner tiers allowing a user to move further from a center to obtain more specific information about a resource usage.

A computing device may generate such a visualization by processing data and controlling a display screen to display the tiers. In some embodiments, a database system may transmit the information to populate each segment of each tier to a computing device. The computing device may receive that information and populate the visualization with the received data. As a cursor moves, the computing device may either read from received data to determine how to populate the numerical indicator or request a numerical indicator from the database system.

In some embodiments, the database system may send some information, such as a greatest specificity data available or to be displayed to a computing device. The computing device may use that information to calculate the data for the display. Examples of using greater specificity data to calculate less specific data are given elsewhere herein. Such calculation may be made by the computing device to populate the visualization.

The examples of FIGS. 2 to 5 are shown as an ongoing, real time, or near real time display of usage. In such an example, the display does not have information from the middle of the fourteenth hour onward. Such information may continue to be populated as time passes and data about further segments is available and received from a database system. Other embodiments may not offer such a real time functionality but rather may display information about historic time period sonly. Segments about which there is no data yet may not be populated with a color from the key and may not result in a numerical indicator being populated if they are selected and/or hovered over.

In some embodiments, a user may select a time period, a resource, and/or a device of interest. That selection may be used to determine the information to be visualized. Although a selection interface is not shown for such a selection, it would be understood by one of skill in the art. For example, a user may enter a time period, select from a set of available time periods, selected (one or more) from a set of available resources to display, select from a set of available devices (e.g., processors, networks, etc.) to display, and so on. A computing device may use that selection to request the appropriate information from a database server and make the appropriate visualization to the user.

In some embodiments, a user may actuate a section of the interface. For example, in FIG. 2, the user may actuate the section over which the cursor is positioned. Such actuation may be performed for example, by clicking, double clicking, and/or otherwise pressing a section with a mouse, finger, button, etc. In response to the actuation, the visualization may be changed based on the section actuated.

Figure 6:
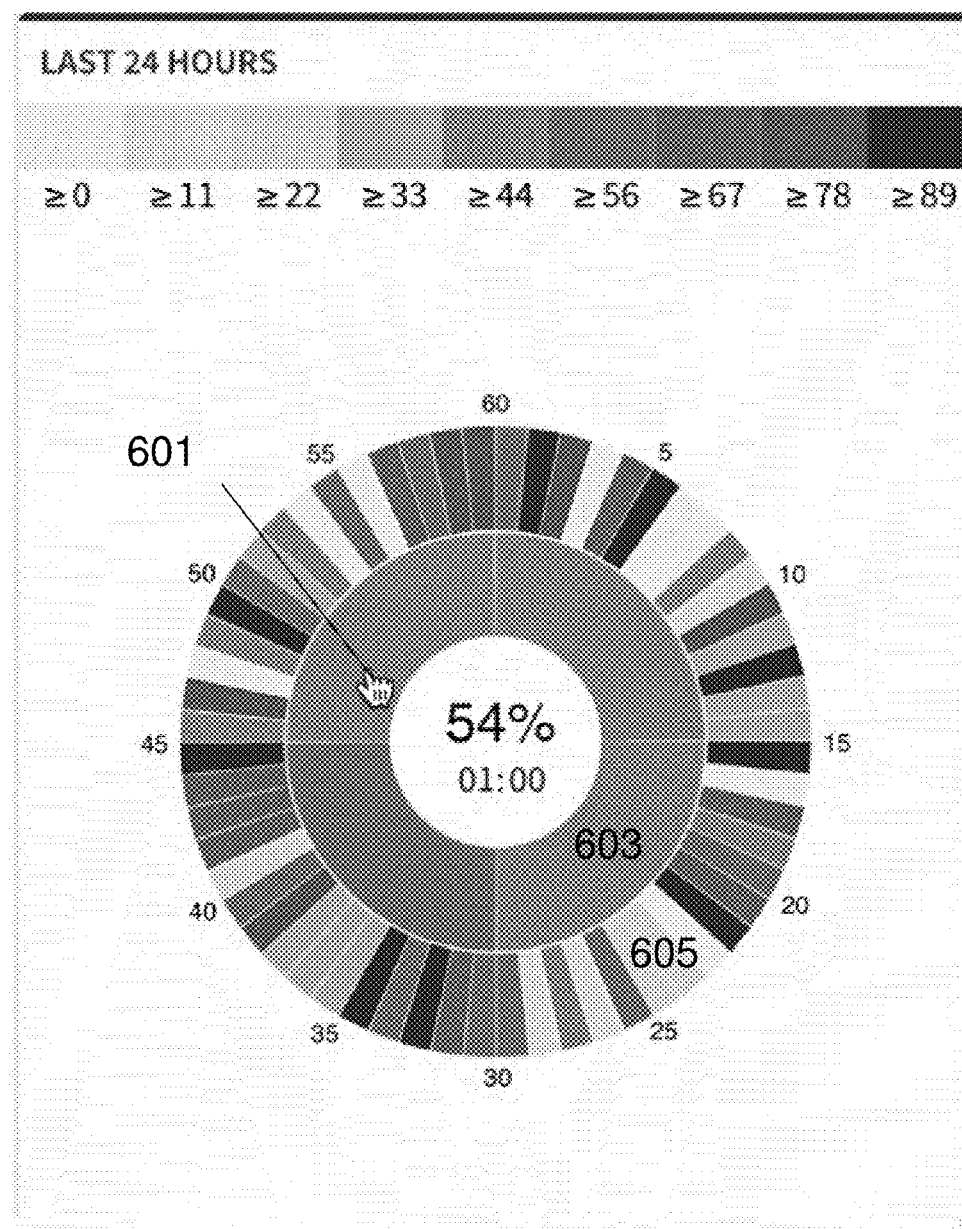
FIG. 6 depicts an example interface according to at least one embodiment disclosed herein.

For example, in response to the actuation of the segment over which the cursor is positioned in FIG. 2, the visualization may be changed to be similar to that of FIG. 6. In response to an actuation of a segment, the visualization may be changed to effectively zoom in on the segment actuated. Here, FIG. 6 shows the data about the first hour of the twenty-four hour period shown in FIG. 2 because the actuated section corresponded to that first hour.

FIG. 6 shows a cursor 601, a first tier 603, a second tier 605 and a numerical indicator 607. These elements may operate similar to those described with respect to FIG. 2.

For example, the first tier may reflect data about the actuated time period in FIG. 2. Here, that data is the data that was in tier two of FIG. 2 and was associated with the actuated segment of FIG. 2. That is, these elements are the four fifteen minute segments from tier two of FIG. 2 that made up the first hour in tier one of FIG. 2.

As another example, the second tier may reflect data about the actuated time period in FIG. 2 as well. Here, that data is the data that was in tier three of FIG. 2 and was associated with the actuated segment in FIG. 2. That is, these elements are the sixty one minute segments from tier three of FIG. 2 that made up the first hour in tier one of FIG. 2.

Figure 7:
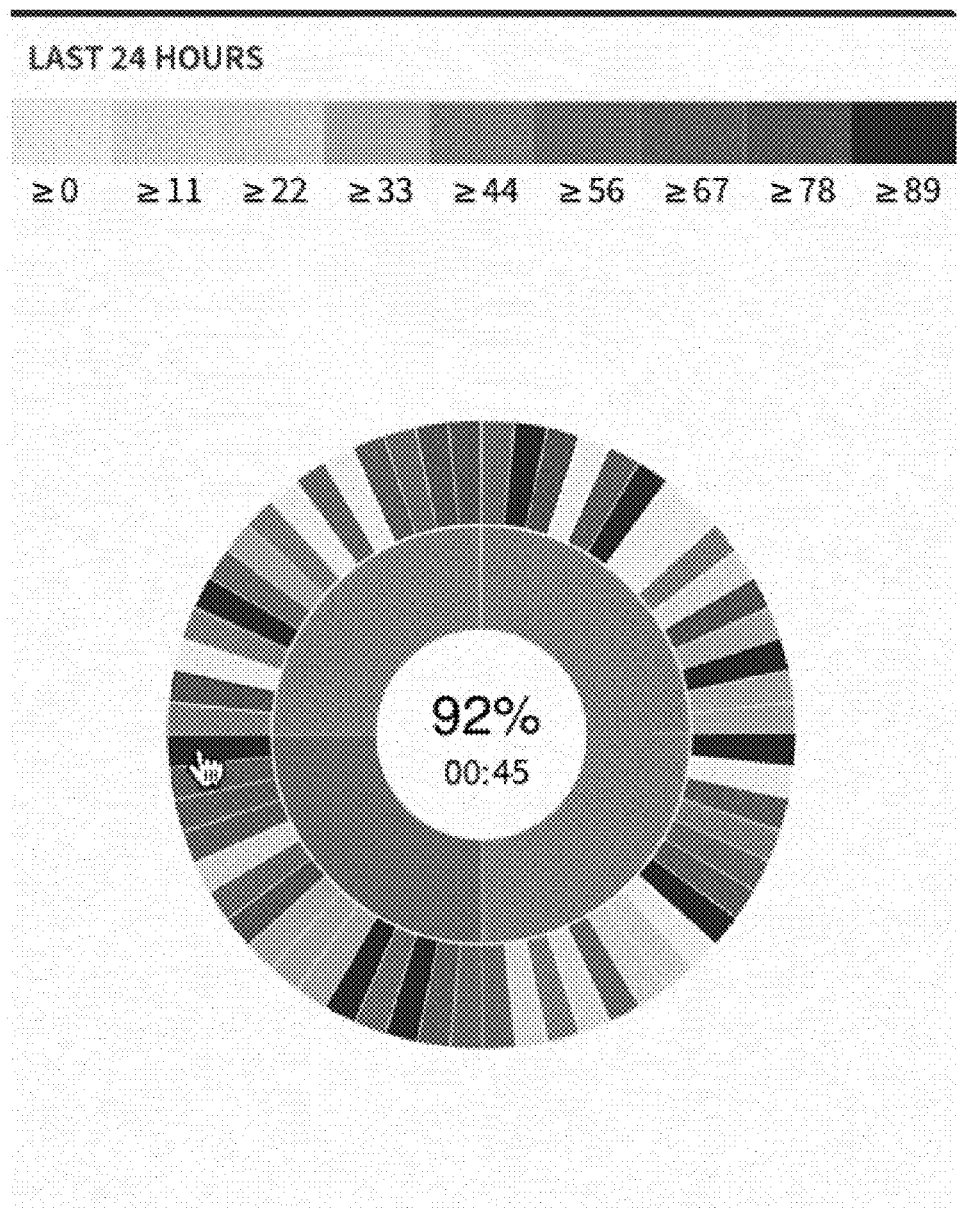
FIG. 7 depicts an example interface according to at least one embodiment disclosed herein.

The cursor may similarly move around from segment to segment in this interface. The numerical indicator may be changed as a new segment is selected and/or hovered over. For example in FIG. 6 the fourth segment in the first tier is hovered over. The numerical indicator shows that that segment corresponds to 01:00 of the period of time from FIG. 2 (i.e., the period that ends spans from 00:45 to 01:00) and that CPU usage during that time period was 54%. As another example, FIG. 7 illustrates the cursor moving to the forty-fifth segment of tier two. The numerical indicator, in response, is changed to indicate that the time corresponds to 00:45 of the period of time from FIG. 2 and that CPU usage during that time was 92%.

In some embodiments, there may be additional tiers in such an interface. The additional tiers may add higher levels of specificity. Those tiers may be additional to the tiers that were previously displayed. The example of FIGS. 6 and 7, however, are an example of minutes being the highest level of specificity. Other embodiments may include any number of layers of specificity at any level. For example, specificity may go as specific as the tenths of seconds, hundredths of seconds, microseconds, milliseconds, nanoseconds, picoseconds, and so on. Some embodiments may have a lower level of specificity as starting point than those shown in FIG. 2. It should be recognized that various embodiments may have any number of steps or levels of specificity and any number of steps between such levels as desired.

Figure 8:
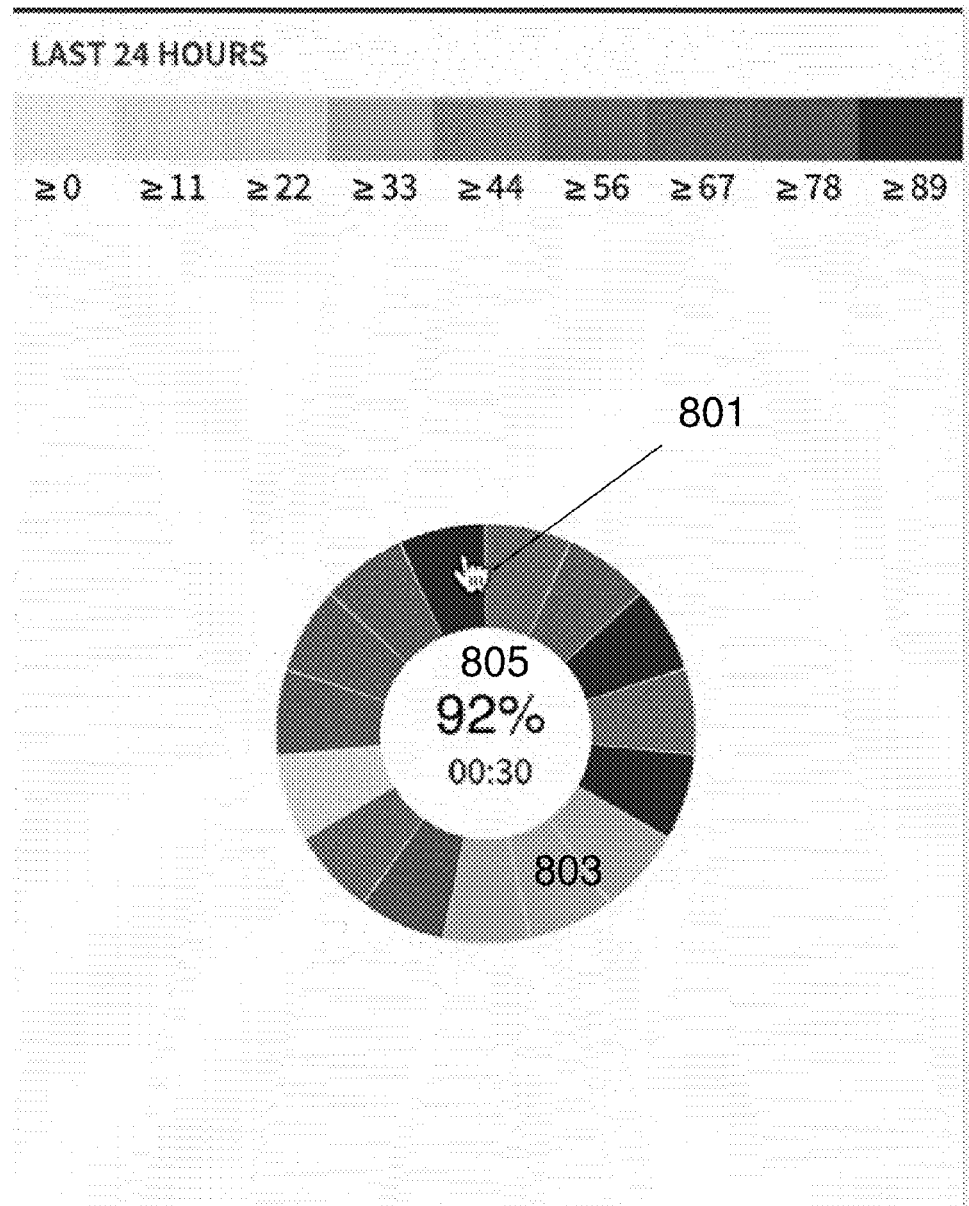
FIG. 8 depicts an example interface according to at least one embodiment disclosed herein.

In some embodiments, a segment in a visualization such as that of FIG. 6 or 7 may be actuated. For example, a second segment of the first tier of FIG. 6 or 7 may be actuated. This segment may correspond to the second fifteen minutes of the twenty-four hour period of FIG. 2. In response, a new visualization may be displayed base don't hat selection. FIG. 8 illustrates an example of such a visualization. In response to an actuation of a segment, the visualization may be changed to effectively zoom in on the segment actuated.

FIG. 8 shows a cursor 801, a first tier 803 and a numerical indicator 805. These elements may operate similarly to those described with respect to prior figures.

For example, the first tier may reflect data about the actuated time period from FIG. 6. Here the data is the data that was in tier 2 of FIG. 6 and was associated with the actuated segment in FIG. 6. That is, these elements are the fifteen minutes segments from tier two of FIG. 6 that made up the second fifteen minutes in tier 1 of FIG. 6.

The cursor may similarly move around from segment to segment. The numerical indicator may be changed as a new segment is selected and/or hovered over. For example, in FIG. 8 the fifteenth segment in tier 1 is hovered over. The numerical indicator shows that that segment corresponds to 00:30 of the period of time from FIG. 2 and that CPU usage during that time period was 92%.

As discussed with respect to FIGS. 6 and 7, there may be more tiers in this visualization or the tiers may have different specificity levels as desired. There may be any number of layers of depth to a visualization. FIG. 8 may show an example of lowest level in some embodiments. FIGS. 6 and 7 may show an example of a second lowest level in some embodiments. FIGS. 2-5 may show an example of a third lowest level in some embodiments. Any of such levels may be a highest level or there may be higher levels, which may or may not have more tiers) as desired.

The examples so far have been given in terms of moving from one layer down to another layer. Some embodiments may allow for other types of level movement. For example, in some embodiments, from a level of FIG. 2, a user may actuate a segment in the second tier corresponding to the third fifteen minute segment of the first hour. In response, the user may be presented with the visualization of FIG. 8. In this way, a user may skip a visualization zoom in and effectively zoom in twice by one actuation. This may have a similar effect in higher tiers to allow any number of zoom in as desired.

In some embodiments, an actuation on a highest level of specificity may display additional information about that layer of specificity. For example, while CPU usage is shown now in the center indicator. If a highest level of specificity is actuated, that may be an indication that a user desired more information about that specific time slice. So, a system may provide more information about that time slice, such as other resource usage.

Figure 9:
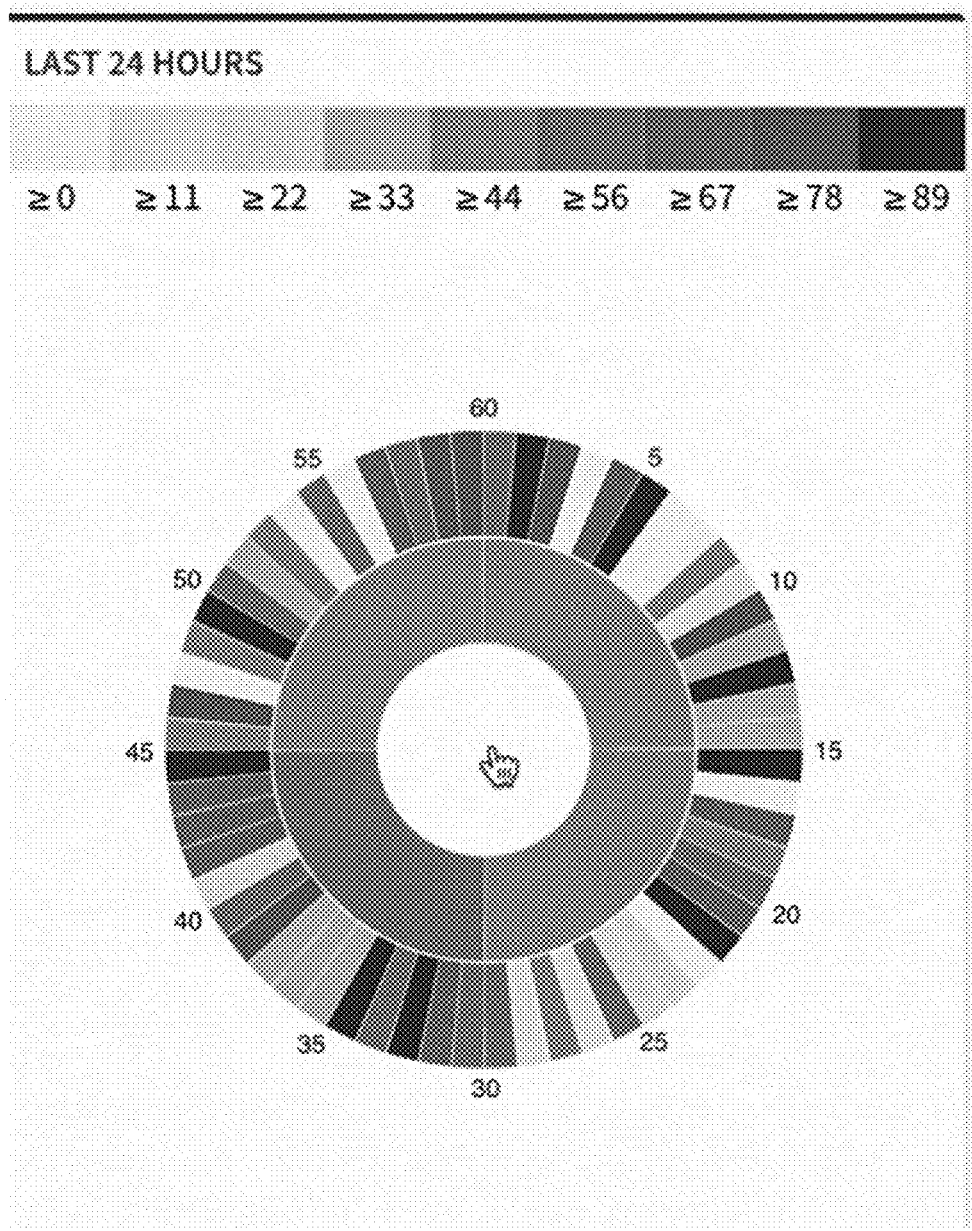
FIG. 9 depicts an example interface according to at least one embodiment disclosed herein.

In some embodiments, a user may be able to actuate a section of the visualization to move out to a lower level. For example, in FIG. 8, a user may actuate a center portion with the numerical indicator to move back out to a lower level of specificity. In response to an actuation of that section, the user, may be presented with a display similar to that in FIG. 9. A user may actuate the center in the display of FIG. 9 to move further out another level (e.g., to a display similar to that of FIG. 2). A user may actuate a section in FIG. 9 to move down to a high level of specificity.

By using such a visualization interface, a user may zoom in and at to view a desired level of specificity at any desired time.

It should be recognized that various examples are non-limiting. Other embodiments may be arranged or operate in different manners with different specificity and/or data. For example, some embodiments may have segments in tiers that are not aligned rather than the examples of aligned segments given. As another example, some embodiments may identify a segment by a beginning time rather than an end time of the segment in the numerical indicator. As yet another example, some embodiments may not use a cursor but may rather and/or additionally use a touch pad (e.g. one touch to select a segment a double tap to actuate a segment). One of ordinary skill in the art will recognize that many other elements may differ and are still contemplated by this disclosure.

Some embodiments may include at least one resource monitor configured to: monitor one or more resources of a network configured for low latency trading operations at a first level of specificity; and report the monitored one or more resources to a database system at the first level of time-specificity, in which reporting include identifying a respective monitored time. For example element 103 may act as such a resource monitor. The resource monitor may include one or more processors. The network may include a software defined network.

Some embodiments may include the database system configured to: receive the reported monitored one or more resources; in response to receiving the reported monitored one or more resources, store the reported monitored one or more resources keyed by the respective monitored time at the first level of specificity; receive a request, from a client program, for information about the one or more resources from a range of time; in response to receiving the request for information, transmitting, to the client program, data indicating the usage of the one or more resources over the range of time at the first level of specificity. For example, element 101 may act as such a database system.

Some embodiments may include the client program configure to: receive a selection of the one or more resources and the range of time; in response to receiving the selection, transmitting, to the database system, the request for information; receiving, from the database system, the data indicating the usage of the one or more resources over the range of time at the first level of specificity; in response to receiving the data, render the data into a graphical representation of the data with a second level of specificity, in which the second level of specificity is less specific than the first level of specificity, in which the graphical representation of the data with the second level of specificity: 1) presents the information in a circular format with time increasing around the circle, and 2) is divided into a plurality of slices of times in the range of time, in which each slice of the plurality of slices covers a portion of the range of time, in which the plurality of slices sum to the whole range of time, in which each slice presents a level of resource usage at the second level of specificity; receiving a selection of one slice of the plurality of slices of the graphical representation; and in response to receiving the selection of the one slice of the plurality of slices, adjusting the graphical representation to focus on the portion of the range of time covered by the one slice, in which adjusting the graphical representation includes: 1) expanding the one slice to cover the circular format of the graphical representation, and 2) dividing the one slice into a plurality of sub slices that each cover a portion the portion of the range of time covered by the one slice and in which the plurality of sub slices sum to the portion of time covered by the one slice, in which each subslice presents a level of resource usage over a respective covered time. For example, element 105 and/or a program executed thereby may act as such a client program. Various examples of such graphical representations are given thorough. In some implementations, the adjusted graphical representation allows a user to further adjust the graphical presentation to become more specific. In some implementations, the adjusted graphical representation includes a control that allows a user to remove the adjustment. In some implementations, each subslice presents at the first level of specificity. In some implementations, each subslice presents at a level of specificity that is less specific than the first level of specificity. In some implementations, the graphical representation before the adjustment includes concentric slices at different levels of specificity that are each less specific than the first level of specificity.

Processes and/or Apparatus

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

VIII. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. An apparatus comprising:
   at least one processor configured to control:
      monitoring one or more resources of a network configured for low latency trading operations at a first level of time-specificity; and
      reporting the monitored one or more resources to a database system at the first level of time-specificity, in which the reporting includes identifying a respective monitored time;
   the database system including at least one second processor configured to control:
      receiving the reported monitored one or more resources;
      in response to receiving the reported monitored one or more resources, storing the reported monitored one or more resources keyed by the respective monitored time at the first level of specificity;
      receiving a request, from a client program, for information about the one or more resources from a range of time;
      in response to receiving the request for information, transmitting, to the client program, data indicating the usage of the one or more resources over the range of time at the first level of specificity;
   the client program including instructions which, when executed by a given processor, control to:
      receive a selection of the one or more resources and the range of time;
      in response to receiving the selection, transmit, to the database system, the request for information;
      receive, from the database system, the data indicating the usage of the one or more resources over the range of time at the first level of specificity;
      in response to receiving the data, render the data into a graphical representation of the data with a second level of specificity, in which the second level of specificity is less specific than the first level of specificity, in which the graphical representation of the data with the second level of specificity:
         1) presents the information in a circular format with time increasing around the circle, and
         2) is divided into a plurality of slices of times in the range of time, in which each slice of the plurality of slices covers a portion of the range of time, in which the plurality of slices sum to the whole range of time, in which each slice presents a level of resource usage at the second level of specificity;
      receive a selection of one slice of the plurality of slices of the graphical representation; and
      in response to receiving the selection of the one slice of the plurality of slices, adjust the graphical representation to focus on the portion of the range of time covered by the one slice, in which adjusting the graphical representation includes:
         1) expanding the one slice to cover the circular format of the graphical representation, and
         2) dividing the one slice into a plurality of subslices that each cover a portion of the portion of the range of time covered by the one slice and in which the plurality of subslices sum to the portion of time covered by the one slice, in which each subslice presents a level of resource usage over a respective covered time.

2. The apparatus of claim 1, in which the network includes a software defined network.

3. The apparatus of claim 1, in which the one or more resources includes at least one of CPU usage, memory pressure, memory rate, network input/output, temperature, power usage, latency, free memory, memory fragmentation, available bandwidth, or used bandwidth.

4. The apparatus of claim 1, in which the one or more resources includes at least one of: number of trades per second, amount of money, instruments traded, incoming orders, executed trades, outgoing orders, number of cancelations, or volume of sales or purchases.

5. The apparatus of claim 1, in which the at least one processor includes a plurality of first processors.

6. The apparatus of claim 1, in which the adjusted graphical representation allows a user to further adjust the graphical presentation to become more specific.

7. The apparatus of claim 1, in which the adjusted graphical representation includes a control that allows a user to remove the adjustment.

8. The apparatus of claim 1, in which the each subslice presents at the first level of specificity.

9. The apparatus of claim 1, in which each subslice presents at a level of specificity that is less specific than the first level of specificity.

10. The apparatus of claim 1, in which the graphical representation before the adjustment includes concentric slices at different levels of specificity that are each less specific than the first level of specificity.

* * * * *